United States Patent [19]

Parker et al.

[11] Patent Number: 5,061,012
[45] Date of Patent: Oct. 29, 1991

[54] CHILD CAR SEAT WITH AUTOMATIC HARNESS ADJUSTMENT

[75] Inventors: Robert M. Parker, Aurora; Douglas Golenz, Westminster; Roy E. Knoedler; Gregg Harvey, both of Boulder, all of Colo.

[73] Assignee: Gerry Baby Products Company, Denver, Colo.

[21] Appl. No.: 577,695

[22] Filed: Sep. 4, 1990

[51] Int. Cl.$^5$ ............................................. A47D 15/00
[52] U.S. Cl. .................................. 297/467; 297/487; 297/250
[58] Field of Search ............... 297/467, 250, 487, 216, 297/484, 488; 280/801, 808

[56] References Cited

U.S. PATENT DOCUMENTS

| | | | |
|---|---|---|---|
| 2,851,084 | 9/1958 | Benjetsky | 155/11 |
| 3,762,768 | 10/1973 | Hyde et al. | 297/467 |
| 4,376,551 | 3/1983 | Cone | 297/467 |
| 4,436,341 | 3/1984 | Converse | 297/467 |
| 4,545,613 | 10/1985 | Martel et al. | 297/250 |
| 4,580,842 | 4/1986 | Segal | 297/488 |
| 4,632,460 | 12/1986 | Meeker et al. | 297/467 |
| 4,655,506 | 4/1987 | Wise et al. | 297/467 |
| 4,662,683 | 5/1987 | Knoedler et al. | 297/488 |
| 4,679,852 | 7/1987 | Anthony et al. | 297/464 |
| 4,720,148 | 1/1988 | Anthony et al. | 297/474 |
| 4,770,468 | 9/1988 | Shubin | 297/487 |
| 4,880,277 | 11/1989 | Takahashi et al. | 297/467 |

FOREIGN PATENT DOCUMENTS 2175194A 11/1986 United Kingdom.

Primary Examiner—Peter R. Brown
Assistant Examiner—Milton Nelson, Jr.
Attorney, Agent, or Firm—Biebel & French

[57] ABSTRACT

A child car seat having an improved restraint system in which the restraint system may be easily connected and disconnected, automatically placed about the child in the proper position, and automatically adjusted to properly secure the child within the seat. The restraint system includes a pivotal barrier assembly, a harness assembly, and an adjusting assembly, each of which is interconnected. As a portion of the barrier assembly is pivoted into a position in front of the child, the harness assembly is automatically placed upon the child in the proper position. Moreover, the harness assembly is automatically adjusted about the child by the adjusting assembly. When the restraint system is in the locked position by locking of the barrier assembly, further loosening of the harness assembly is substantially prohibited by the adjusting assembly. However, the adjusting assembly is able to act upon the harness assembly to automatically remove any slack therefrom which may exist either before or after locking of the restraint system.

19 Claims, 6 Drawing Sheets

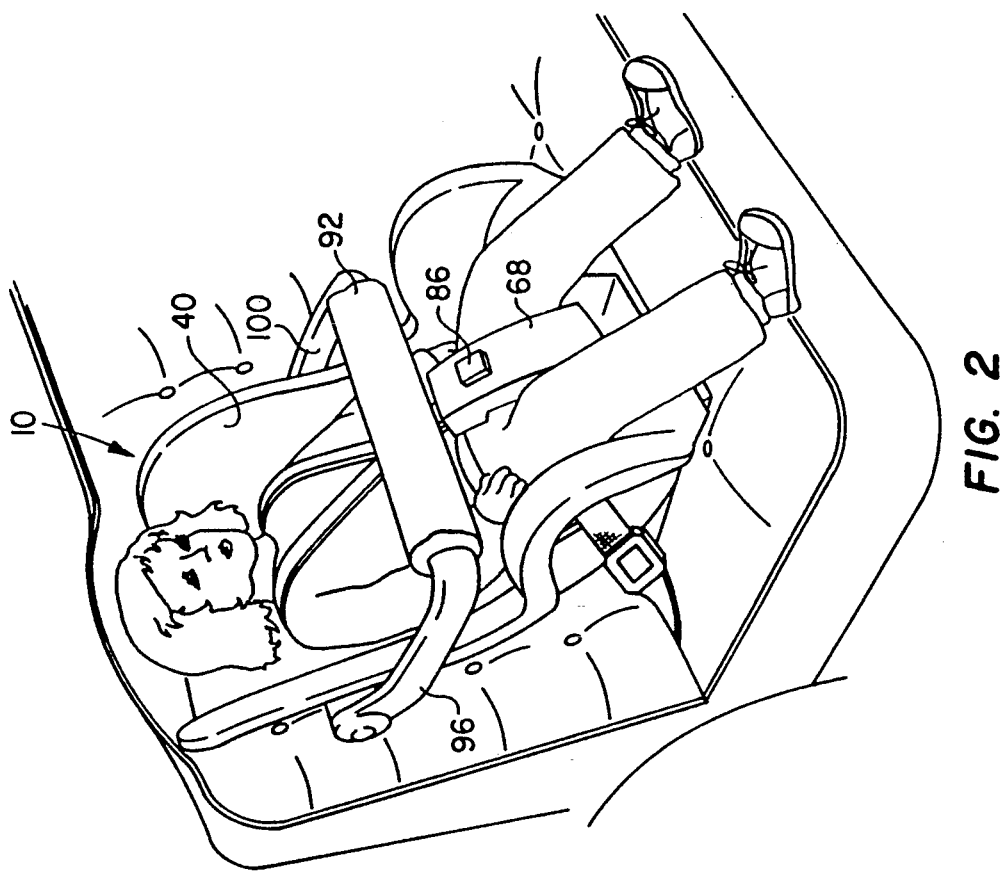
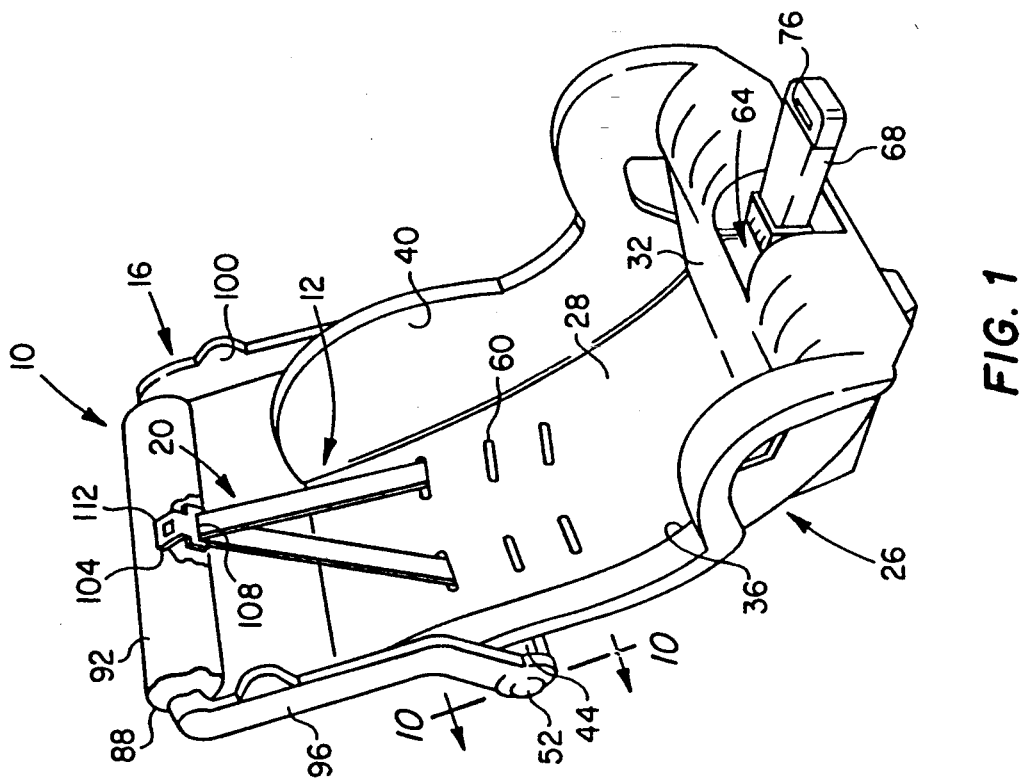

CHILD CAR SEAT WITH AUTOMATIC HARNESS ADJUSTMENT

FIELD OF THE INVENTION

This invention relates generally to the field child car seats and, more particularly, to child car seats having an automatically adjustable restraint system.

BACKGROUND OF THE INVENTION

The use of infant car seats for transporting children in motor vehicles has become widespread, due in part to the recognition that such devices enhance the safety accorded infant motor vehicle passengers and also since a majority of states now require their usage until the infant reaches a certain age and/or weight. Consequently, the infant car seat market has become quite lucrative and manufacturers have expended significant development efforts in order to offer a competitive product. Much of these development efforts have concentrated on both improving the safety features of the infant car seat and providing a seat which is still convenient to use in relation to placing infants in and removing them from the seat. The particular assembly of the infant car seat which may potentially provide both of these desirable features is the restraint mechanism, and therefore many design variations are currently available.

Some of the initial restraint mechanisms employed in infant car seats utilized a simple shoulder harness assembly. For instance, U.S. Pat. No. 4,545,613 to Martel et al., issued Oct. 8, 1985, discloses a shoulder harness having two laterally displaced straps which extend through the back of the infant car seat and taper to a point where the shoulder harness is detachably connected to the seat portion in a position between the infant's legs. A buckle assembly permits manual adjustment of the shoulder harness to accommodate infants of different sizes.

U.S. Pat. No. 4,623,460 to Meeker et al., issued Dec. 30, 1986, discloses a variation of a simple shoulder harness restraint mechanism by incorporating a padded shield. Two laterally displaced shoulder straps extend through the back of the infant car seat and attach to the shield. The shield has a portion which substantially covers the chest region of the infant, a central portion which passes between the legs of the infant, and a tongue attached to the end of this central portion for detachable engagement with the seat. The drawings indicate that the shoulder harness straps extend through the back portion of the infant seat where they are apparently joined into a single strap. This single strap then apparently loops around the exterior shell of the infant seat, passes through a locking mechanism, and exits the front, lower portion of the infant seat. Therefore, adjustment of the shoulder harness appears to involve pulling this single strap away from the seat to tighten the shoulder harness or manually releasing the locking mechanism so that the shoulder harness may be pulled away from the seat back to loosen the shoulder harness.

U.S. Pat. No. 4,679,852 to Anthony et al., issued July 14, 1987, discloses an infant car seat and shoulder harness assembly similar to that of Meeker et al., but provides more detail on the actual adjusting/locking mechanism. As in Meeker et al., Anthony et al. includes two shoulder straps which are attached to a T-shaped, padded shield which is in turn detachably connectable to the seat bottom. The two shoulder straps pass through the back of the seat and join into a single strap which passes through an adjusting/locking mechanism located in the lower, front portion of the seat. More particularly, the strap passes between a spring biased, pivotable cam having a knurled surface and an engaging surface. A handle is provided with the cam to allow the shoulder harness to be manually adjusted by manually pivoting the cam away from the strap so that the harness may be pulled in the appropriate direction to either tighten or loosen the harness on the infant. When the handle is released, the spring biases the cam to engage with and lock the single strap and thus the shoulder harness.

Although infant car seats which employ only a shoulder harness assembly remain popular, particularly in those infant seats specifically designed for use by babies, infant car seats which utilize some type of frontal barrier are also now available and may possibly offer more protection when the infant reaches the toddler stage. For instance, U.S. Pat. No. 2,851,084 to Benjetsky, issued Sept. 9, 1958, illustrates an early version of a restraining mechanism for an infant car seat which incorporates a barrier and harness mechanism. Benjetsky discloses an infant car seat having a back and seat portion, an essentially tubular frontal barrier, and an adjustable belt which extends across the chest region of the infant. The frontal barrier includes a substantially U-shaped member, the ends of which are pivotally attached to the back, and a pivot bar which is either fixedly or pivotally attached to the central portion of the U-shaped member on one end thereof and pivotally attached to the seat portion on the opposite end. The belt, which includes a buckle for adjusting its tension, is attached to the two ends of the U-shaped member. In order to place an infant in the seat, the pivot bar is allegedly placed in a substantially horizontal position and then pivoted to its locked vertical position for proper positioning of the frontal barrier. Although disclosing an infant car seat with a pivotal frontal barrier and harness mechanism, the pivotal motion does not properly position the belt on the infant, nor does it automatically control its adjustment. To the contrary, the belt buckle must be unlatched, reconnected, and manually adjusted to properly secure the infant within the seat.

U.S. Pat. No. 4,662,683 to Knoedler, et al., issued May 5, 1987, illustrates a more modern variation of an infant car seat having a movable barrier and harness mechanism. Knoedler, et al. discloses a split-barrier configuration in which one barrier is pivotally attached to each side of the seat, each barrier having one of the shoulder straps attached thereto. A crotch strap attached to the seat portion extends up between the infant's legs for detachable engagement with the two barriers when pivoted into a position forming a lateral barrier across the infant seat. Pivoting of the barriers into this lateral position allegedly results in proper positioning of the shoulder harness on the infant. However, there is no disclosure relating to the manner in which the tension of the shoulder harness is adjusted. More particularly, there is no suggestion that pivotation of the barriers may be employed to automatically adjust the tension of the harness on the infant.

U.S. Pat. No. 4,580,842 to Segal, issued Apr. 8, 1986, discloses an alternate restraint mechanism which incorporates a single movable barrier and harness assembly. The barrier of Segal is pivotally attached to one side of the seat and extends laterally across the seat when in its downward position. A harness assembly consisting of two shoulder straps, two lap straps, and a crotch strap are interconnected and fixedly attached to the infant car seat. The harness assembly must be manually adjusted and it is not automatically placed in the proper position on the infant by movement of the barrier. In fact, the only inter-connection between the harness assembly and the barrier is that after proper adjustment of the harness assembly, the crotch strap is passed through the barrier for connection with the shoulder and lap straps which not only secures the infant within the seat, but serves to keep the barrier in its downward position.

U.S. Pat. No. 4,770,468 to Shubin, issued Sept. 13, 1988, discloses an infant seat which utilizes a pivotally mounted frontal barrier and integrated harness assembly. A frontal barrier having a portion extending laterally across the seat is pivotally attached to the seat via extensions so that it may be pivoted above the infant's head. Fixedly attached to the lateral portion of the frontal barrier is a crotch member which is detachably connected with the seat bottom. The harness assembly consists of a lap strap and two shoulder straps. The lap strap is fixedly attached to the sides of the frontal barrier. One end of each shoulder strap may be manually positioned on this lap strap in a plurality of locations while the second end of each shoulder strap is attached to a mechanism on the back of the infant seat whose vertical positioning may be manually adjusted to accommodate infants of different sizes. Although disclosing an infant seat in which a frontal barrier cooperates with a harness assembly to position the harness assembly on the infant by pivoting the frontal barrier into its downward position, pivoting of the frontal barrier does not automatically adjust the harness to the infant. To the contrary, the disclosure indicates that the shoulder straps must be manually repositioned on the lap strap while another portion of the disclosure is directed to the actual mechanism which allows the vertical positioning of the shoulder straps to be manually adjusted.

U.S. Pat. No. 4,655,506 to Wise et al., issued Apr. 7, 1987, discloses an infant car seat having a T-shaped frontal barrier and an integrated shoulder harness assembly. The frontal barrier includes a restraining member which laterally extends between the sides of the seat, the ends of which are pivotally attached to the infant seat via extensions, and a crotch member fixedly attached to the central portion of the restraining member which extends downwardly between the infant's legs for detachable engagement with the seat. Two shoulder straps fixedly attached to the exterior of the infant seat extend through the back of the infant seat for engagement with the restraining member. More particularly, the lower ends of the shoulder straps are threaded over a knurled shaft in the restraining member and extend downwardly therefrom. A mechanism for manually locking the crotch member to the seat cooperates with the knurled shaft to lock the harness in position. Adjustment of the harness assembly is apparently accomplished by pulling on the appropriate ends of the harness to either tighten or loosen the harness prior to engaging the locking mechanism on the crotch member.

Wise et al. also indicates that an automatic harness adjustment system is offered. In order to use this automatic adjustment, the barrier is pivoted into its upward position and the ends of the shoulder straps extending downwardly from the restraining member are pulled taunt. By doing so, the shoulder straps will allegedly extend to adjust to fit the infant's body as the barrier is pivoted into its downward position for engagement with the seat. Although allegedly offering this automatic harness adjustment feature, the disclosure does not indicate if proper tension on the straps is maintained when being positioned on the infant to ensure proper conformance to the contour of the infant. Moreover, there is no suggestion of incorporating a mechanism to remove slack in the harness after engaging the locking mechanism on the crotch member, most likely due to the fact that once the crotch member is locked to the seat, no movement of the shoulder harness in any direction is allowed.

Many of the above-discussed references have primarily addressed providing a restraint system which is automatically positioned on the infant by movement of a frontal barrier. However, there are also references which address restraint systems for infant car seats which are automatically adjusted. Representative of this type of restraint system is U.S. Pat. No. 4,880,227 to Takahashi et al., issued Nov. 14, 1989. Takahashi et al. discloses a restraint system which incorporates a retractor-operated shoulder harness and a T-shaped shield which is freely and pivotally attached to the front portion of the seat bottom. The shoulder harness consists of two straps which extend through the back of the infant seat where they are fixedly attached to the seat bottom on the sides thereof. The opposite ends of the straps join into a single strap on the back side of the infant seat which is then attached to a retractor (not illustrated), the function of which is to in part maintain tension on the shoulder harness. In order to secure an infant within the seat, the shoulder straps are individually extended out from the seat back and the infant's arms are inserted so that the straps pass over the infant's shoulders. The shield is pivoted into an upright position to contact the infant and the straps are then placed into essentially slots on the face of the shield. The retractor automatically adjusts the straps to the infant by removing any existing slack, but does not actually lock the shoulder harness until a certain deceleration is experienced.

Another variation of an automatically adjusted restraint mechanism is disclosed in UK Patent Application No. 2,175,194A to Merten, published Nov. 26, 1986. The primary disclosure of Merten addresses the seat belt adjusting/locking device, although the disclosure does indicate that the apparatus is particularly useful in combination with an infant car seat. In this regard, there is a strap which passes over the infant's shoulders and attaches to a padded chest protector which in turn is attachable to the seat bottom. The other end of the strap is attached to and wound upon a spool which is biased to retract the strap. A ratchet attached to the spool and a pawl for engaging the ratchet to restrict further withdrawal of the shoulder harness are also provided. These components are allegedly common in many seat belt retractors where withdrawal of the seat belt is allowed to continue until the extension motion is discontinued, at which time the pawl engages the ratchet to restrict further withdrawal of the strap. Merten allegedly improves upon this known retractor by incorporating a mechanism for ensuring that the pawl does not engage the ratchet to restrict withdrawal of the shoulder harness until the tongue and buckle are engaged.

U.S. Pat. No. 4,720,148 to Anthony et al., issued Jan. 19, 1988, discloses an automatically adjusted harness mechanism for use with an infant car seat which is principally similar to Merten in that the adjusting/locking device includes a spool, ratchet, and a member for engaging the ratchet to lock the shoulder harness only after the tongue is engaged with the buckle.

Although the above-discussed references disclose various mechanisms to enhance the safety of an infant within an infant car seat and the ease with which the restraining mechanism may be positioned and secured, there still exists a need for an infant car seat which utilizes a pivoting barrier assembly and a harness assembly integrally associated therewith which will not only automatically position the harness on the infant, but which will also automatically adjust the harness assembly to the infant by use of an adjusting assembly to firmly secure the infant within the seat.

SUMMARY OF THE INVENTION

The infant car seat of the present invention provides an improved restraint system having a movable barrier assembly, an interconnected shoulder harness assembly, and an interconnected adjusting assembly. This combination of assemblies and their respective interactions provides a restraint system which is easily connected and disconnected, which automatically places the shoulder harness about the infant in the proper position, and which automatically adjusts the shoulder harness to properly conform to the infant so that the infant is securely held within the seat.

The above identified assemblies are positioned on a conventional bucket-type infant car seat known in the art which has a back, seat, and two side walls. Pivotally attached to the infant car seat is the barrier assembly. The barrier assembly includes a center stock pivotally attached to the forward portion of the seat and a swing barrier having a laterally extending restraining member, the ends of which are pivotally attached to the side walls via extensions. Both the center stock and swing barrier may be pivoted into at least two positions. The center stock is pivotal between substantially horizontal (unlocked) and vertical (locked) positions relative to the seat, while the swing barrier is pivotal between a position where the restraining member extends laterally across the forward portion of the seat (locked) and where the restraining member is pivoted above the infant car seat (unlocked). When the swing barrier is in the locked position, the center stock may be pivoted into its locked position to detachably engage with the restraining member to form a suitable frontal barrier.

The shoulder harness assembly is connected to both the swing barrier and the center stock. A shoulder strap extends through a harness slot provided in the back of the infant seat, passes through a portion of the restraining member of the swing barrier, and passes through a second harness slot which is substantially horizontally aligned with the first harness slot. The two ends of the shoulder strap are then joined into a single strap behind the back for fixable engagement with an adjusting assembly that is connectable to the center stock.

The adjusting assembly includes a rotatable spool for storing excess harness, a torsional spring for maintaining the shoulder harness assembly in tension, and a pivotal gripping mechanism for restricting movement of the shoulder harness assembly about a direction which would loosen the shoulder harness on the infant.

The above-described advantages of the present invention are primarily achieved by the interaction of the pivoting center stock and the adjusting assembly, particularly the gripping mechanism. That is, a wire pivotally connected to the gripping mechanism is provided for engagement with the center stock. With the center stock in the locked position, the gripping mechanism exerts a force on the single strap to restrict movement which would loosen the shoulder harness assembly. Pivoting the center stock into the unlocked position causes the center stock to engage the wire to pivot the gripping mechanism sufficiently away from the single strap to allow the shoulder harness assembly to be loosened.

When placing an infant in the infant car seat of the present invention, the swing barrier and center stock are disengaged and the center stock is pivoted to its unlocked position. Placing the center stock in the unlocked position sufficiently disengages the gripping mechanism from the single strap which allows the shoulder harness assembly to loosen as the swing barrier is pivoted to its unlocked position. When the infant is properly positioned within the seat, the swing barrier is pivoted into the locked position, thereby positioning the restraining member in front of the infant. During downward movement of the swing barrier, the shoulder straps are automatically positioned about the infant. Moreover, the shoulder straps are automatically adjusted to the infant by the action of the torsional spring to properly secure the infant within the seat. The center stock is then pivoted into its locked position where it then engages with the restraining member of the swing barrier to form a fixed frontal barrier. This pivoting of the center stock also engages the gripping mechanism with the single strap so that the shoulder harness assembly will remain tightly secured about the infant. If, after locking engagement between the center stock and swing barrier, any slack still remains, the torsional spring acts on the shoulder harness to cause a winding of excess harness portions about the spool to thereby take up the slack.

Based on the foregoing summary, a number of salient features of the present invention are readily discerned. An infant car seat is provided that includes automatic adjustment of the harness assembly about the infant. Manual pulling or adjustment thereof is not required. After the center stock and the swing barrier are connected together, the harness assembly is automatically secured about the child. Even if slack or looseness of the harness is introduced by the child pushing against the harness prior to engaging the center stock and swing barrier, such slack is automatically taken up after the force exerted against the harness is removed.

Additional advantages of the present invention can be readily understood from the following discussion, particularly when taken together with the accompanying drawings.

BRIEF DESCRIPTION OF THE DRAWINGS

FIG. 1 is a perspective view of an infant car seat of the present invention configured to receive an infant;

FIG. 2 is a perspective view of an infant car seat of the present invention properly secured to the seat of a motor vehicle with an infant properly secured therewithin;

DETAILED DESCRIPTION OF THE INVENTION

Figure 3:
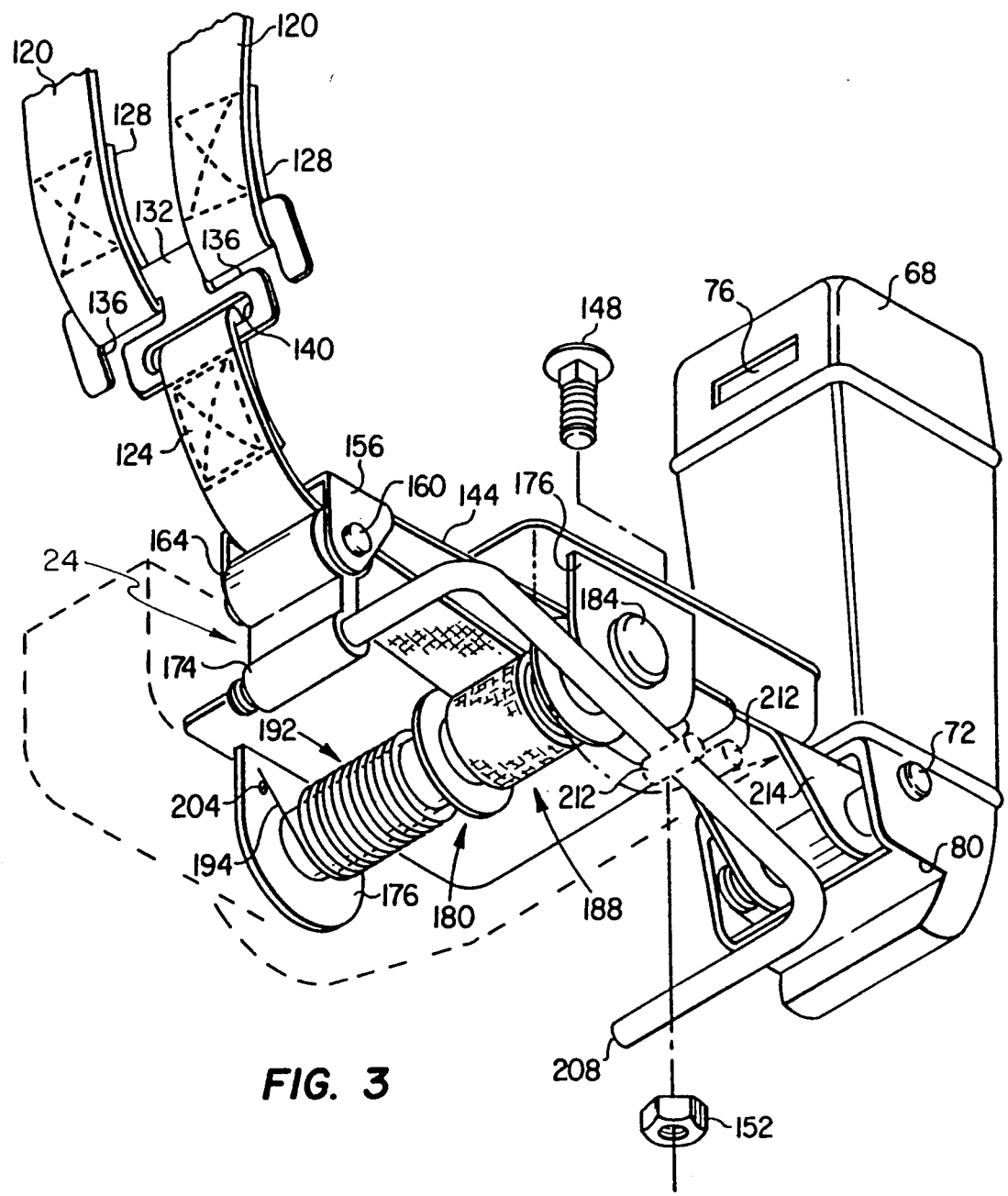
FIG. 3 is a perspective view of the interconnection between the harness assembly, adjusting assembly, and center stock.

The infant car seat 10 of the present invention will be described with reference to the accompanying drawings that illustrate a preferred embodiment. Infant car seat 10 offers an improved restraint system 12 which includes barrier assembly 16, harness assembly 20, and adjusting assembly 24, each of which are connected to a body 26 of infant car seat 10. The interaction of these particular assemblies provides a restraint system 12 which is easily connected and disconnected, which automatically places harness assembly 20 about the infant in the proper position, and which automatically adjusts harness assembly 20 to the infant to properly secure the infant within infant car seat 10.

FIG. 1 illustrates infant car seat 10 in a position to receive an infant. The supporting structure of infant car seat 10, namely body 26, is of the type commonly known in the art and includes back member 28, seat member 32 which is fixedly connected to the lower portion of back member 28, and first side member 36 and second side member 40 which are fixedly positioned on opposite lateral edges of back member 28 and seat member 32, respectively.

Figure 6:
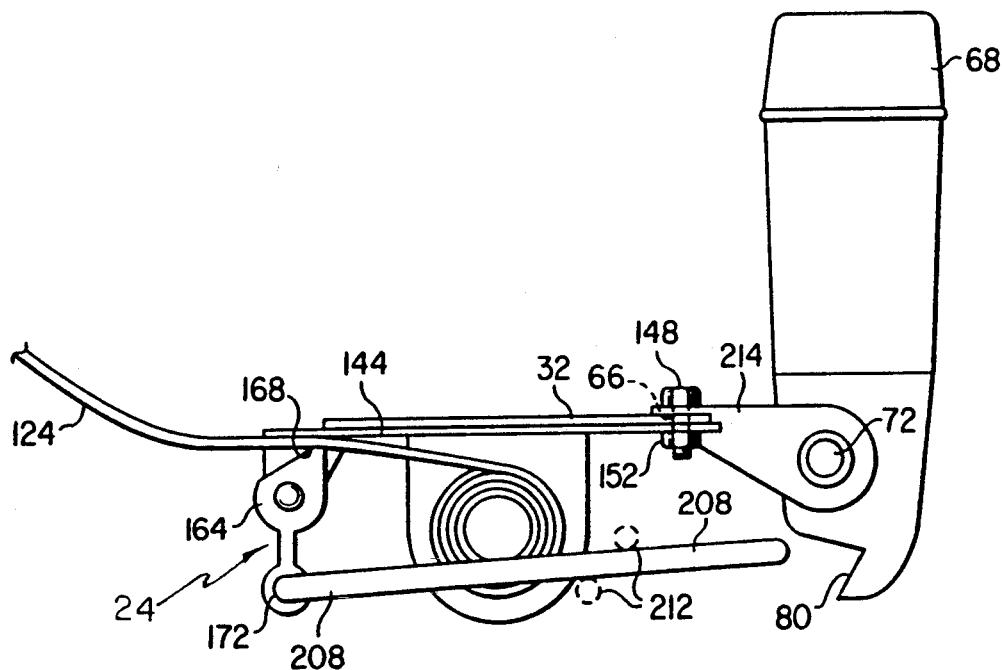
FIG. 6 is a side view of the interconnection between the adjusting assembly and the center stock with the gripper positioned to restrict loosening of the harness assembly.
Figure 7:
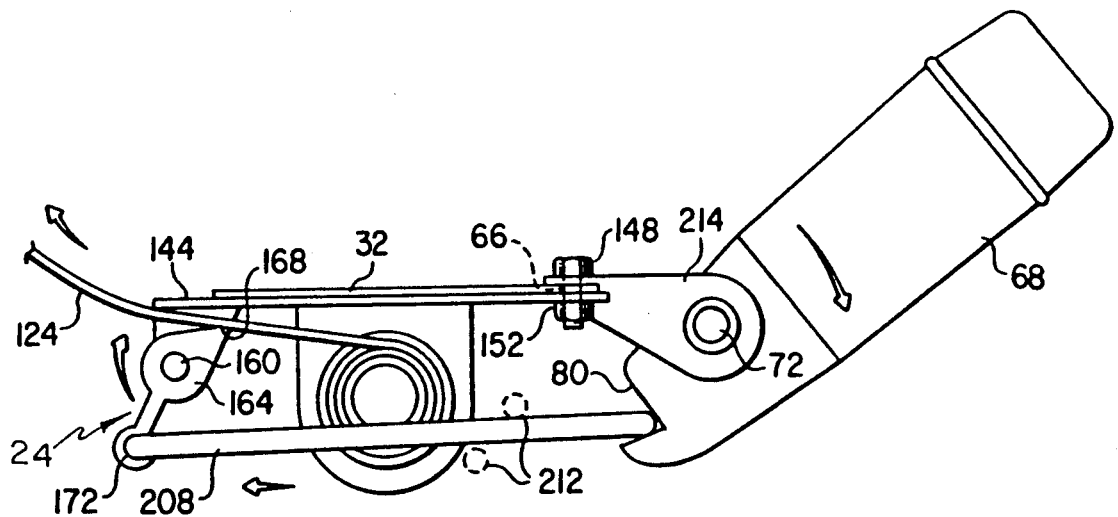
FIG. 7 is a side view of the interconnection between the adjusting assembly and the center stock with the gripper positioned to allow loosening of the harness assembly.

In order to facilitate assembly of restraint system 12, the body 26 of infant car seat 10 incorporates a number of connectors or receivers of various types. For instance, the back, lower portion thereof includes a channel of the type commonly known in the art through which a motor vehicle restraint mechanism (i.e., a seat belt) may pass to secure infant car seat 10 to the seat of a motor vehicle as illustrated in FIG. 2. Referring to FIG. 1, infant car seat 10 also includes first journal 44 and a second journal (oppositely disposed of first journal 44 but not shown) for pivotally receiving swing barrier 88 of barrier assembly 16, as well as pivot slot 64 for receiving center stock 68 of barrier assembly 16. Infant car seat 10 further includes harness slots 60 formed in back member 28 through which shoulder strap 120 of harness assembly 20 passes through for engagement with swing barrier 88 of barrier assembly 16. Harness slots 60 are vertically arranged in pairs to allow child restraint system 12 to be adjusted to the height of the infant. Finally, infant car seat 10 has bore 66 through seat member 32 which is used to fixedly attach adjusting assembly 24 and center stock 68 to infant car seat 10 as best illustrated in FIGS. 3, 6, and 7.

Barrier assembly 16 is pivotally attached to infant car seat 10 and includes center stock 68 and swing barrier 88. Center stock 68 is placed in pivot slot 64 on seat member 32 and may assume at least a first position in which center stock 68 is substantially vertical relative to seat member 32 as illustrated in FIGS. 2, 4, and 6 (locked position) and a second position in which center stock 68 is in a more parallel position relative to seat member 32 as illustrated in FIGS. 1, 5, and 7 (unlocked position). In order to provide for these multiple positions, center stock 68 is pivotally attached by center stock pivot pin 72 to center stock mounting yoke 214 which is attached to seat member 32, together with adjusting assembly mounting bracket 144, by bolt 148 and nut 152 as illustrated in FIGS. 3, 6, and 7. Although the positions of center stock 68 have been described as "locked" and "unlocked", it should be understood that the locked position referred to does not in and of itself mean that restraint system 12 is locked since locking of restraint system 12 requires engagement of center stock 68 with swing barrier 88 as will be described below.

Figure 4:
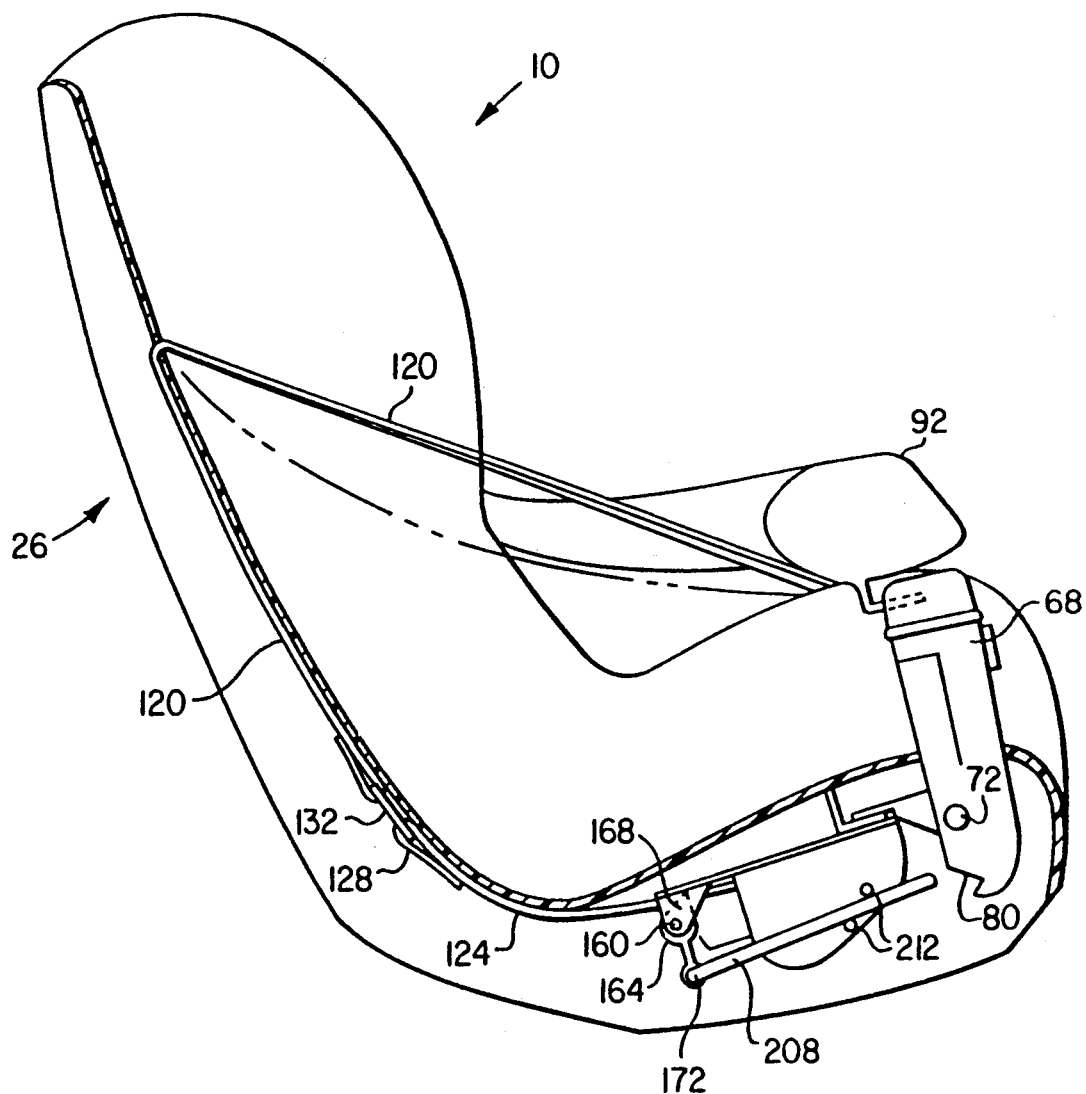
FIG. 4 is a cutaway view of an infant car seat of the present invention with the restraint system in the locked position.
Figure 5:
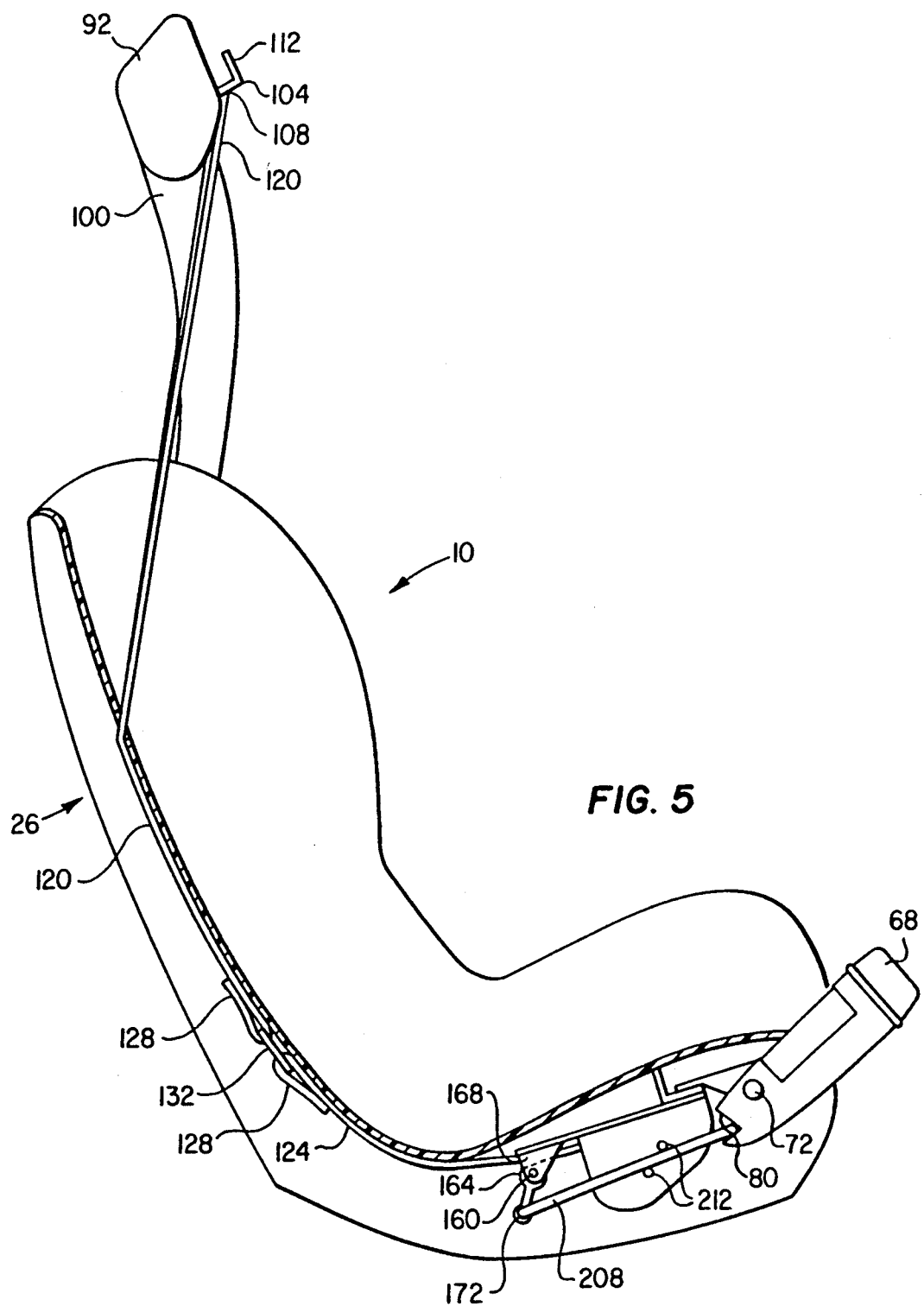
FIG. 5 is a cutaway view of an infant car seat of the present invention with the restraint system in the unlocked position.

Center stock 68 includes tongue receiver 76, as illustrated in FIG. 3, which contains a locking mechanism of a type commonly known in the art for detachable engagement with swing barrier 88, more particularly tongue 112 as illustrated in FIGS. 1, 4, and 5, to form a fixed frontal barrier for infant car seat 10. As a part of this detachable connection between center stock 68 and swing barrier 88, center stock 68 includes actuator 86 for disengaging center stock 68 from swing barrier 88. As illustrated in FIG. 2, actuator 86 is positioned on the upper portion of center stock 68 to provide easy access for disengaging restraint system 12 for removal of an infant from infant car seat 10.

Figure 9:
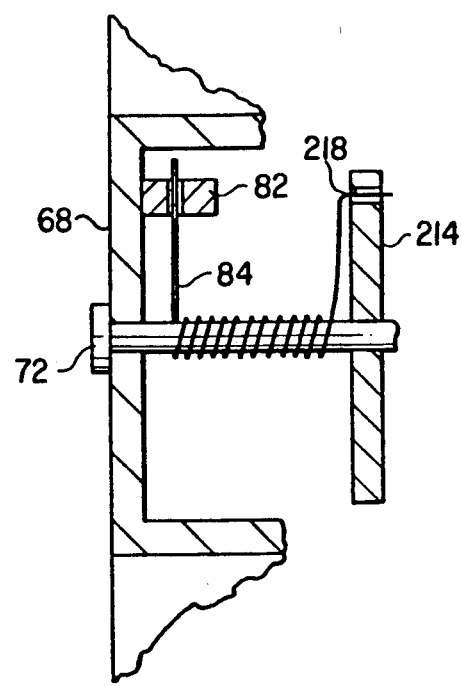
FIG. 9 is an enlarged, partial cross sectional view illustrating the biasing spring for the center stock.

Center stock 68 also interacts with adjusting assembly 24 and thus includes wire receiver 80 which may engage with wire 208 which is pivotally attached to gripper 164 of adjusting assembly 24 as will be discussed in more detail below. As an added safety feature, center stock 68 includes first biasing spring 84, illustrated in FIG. 9, which is wound around center stock pivot pin 72 to bias center stock 68 in the unlocked position. One end of first biasing spring 84 is positioned in center stock extension 82 which is fixedly attached to center stock 68, while the second end is positioned in center stock yoke aperture 218 in center stock mounting yoke 214. First biasing spring 84 thus ensures that if a proper connection is not established between center stock 68 and swing barrier 88, center stock 68, together with swing barrier 88 (discussed below), will pivot to their respective unlocked positions so that it will be evident to a person attending to the infant that the infant is not properly secured within infant car seat 10. Although first biasing spring 84 has been described as such, any number of types of springs and interconnections may be utilized to achieve the desired biasing force.

Swing barrier 88 is the second major component of barrier assembly 16 and is pivotally attached to infant car seat 10 and may assume at least two positions—one in which swing barrier 88 is positioned above infant car seat 10 as illustrated in FIGS. 1 and 5 (unlocked position), and a second in which swing barrier 88 is positioned across infant car seat 10 as illustrated in FIGS. 2 and 4 (locked position). As was the case with the position descriptions for center stock 68, references to swing barrier 88 being in a locked position does not necessarily mean that restraint system 12 is locked since this requires the engagement of center stock 68 and swing barrier 88.

Swing barrier 88 is a substantially U-shaped barrier including a first side extender 96 and a second side extender 100 which are pivotally attached to infant car seat 10 by first swing barrier pivot pin 52 and a second swing barrier pivot pin which are positioned in first journal 44 and a second journal, respectively, which are attached to infant car seat 10. The second journal and second swing barrier pivot pin are not illustrated in the drawings but are positioned opposite of first journal 44 and first swing barrier pivot pin 52 which are illustrated in FIG. 1. Restraining member 92 is placed between first side extender 96 and second side extender 100 and fixedly attached thereto to act as a frontal restraint barrier for an infant placed in infant car seat 10. In this regard, restraining member 92 will typically be padded with material as is well known in the art.

Swing barrier 88 interacts with center stock 68 and harness assembly 16 and thus includes mounting bracket 104 which is fixedly attached to the underside of restraining member 92 in the central portion thereof as illustrated in FIGS. 1, 4, and 5. Mounting bracket 104 consists of harness receiver 108, through which shoulder harness 120 passes, and tongue 112, which is positioned substantially parallel to seat member 32 (when swing barrier 88 is in the locked position) for detachable engagement with the locking mechanism within tongue receiver 76 on center stock 68.

Figure 10:
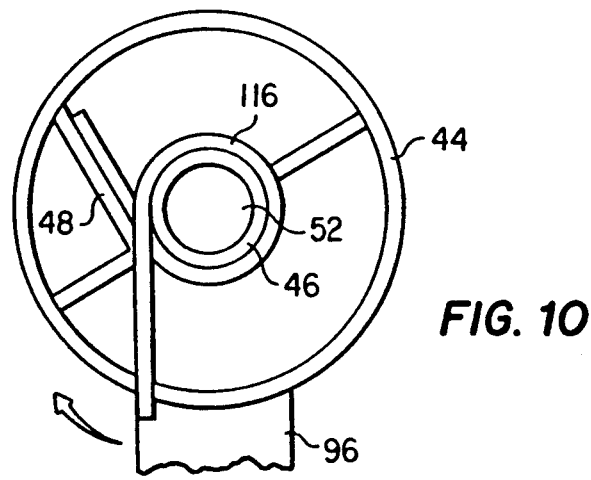
FIG. 10 is an enlarged cutaway view taken along line 10—10 of FIG. 1 illustrating the biasing spring for the swing barrier.

Swing barrier 88 also includes an added safety feature in second biasing spring 116, best illustrated in FIG. 10, which biases swing barrier 88 into the unlocked position (the direction of the arrow) to indicate to a person attending to the infant that a proper connection has not been established between swing barrier 88 and center stock 68. Second biasing spring 116 is wound around pivot pin receiver 46 of first journal 44 which receives first swing barrier pivot pin 52. One end of second biasing spring 116 is positioned on spring receiving surface 48 on the interior of first journal 44, while the second end is positioned an appropriate portion of first side extender 96 of swing barrier 88. Although second biasing spring has been described as such, any number of types of springs and interconnections may be utilized to achieve the desired biasing force.

Harness assembly 20 interacts with barrier assembly 16 to automatically place shoulder strap 120 about a child within infant car seat 10 in the proper position. Furthermore, harness assembly 20 engages with adjusting assembly 24 to automatically adjust shoulder strap 120 to the infant to properly secure the infant within infant car seat 10.

Harness assembly 20 generally includes shoulder strap 120 and extension strap 124 as illustrated in FIGS. 1 and 3. A first end of shoulder strap 120 extends through the back side of back member 28 to its front via harness slot 60. Shoulder strap 120 is then threaded through harness receiver 108 on mounting bracket 104 which is again fixedly attached to the lower, central portion of restraining member 92 of swing barrier 88. This end of shoulder strap 120 thereafter passes through a second harness slot 60 which is laterally disposed from the first harness slot 60. Consequently, shoulder strap 120 as assembled provides a V-shaped configuration, as illustrated in FIGS. 1 and 2, which will be properly positioned about the infant upon pivoting swing barrier 88 into the locked position.

Referring to FIG. 3, the two ends of shoulder strap 120 are interconnected on the back side of infant car seat 10 by engaging with harness connecting bracket 132. More particularly, the two ends of shoulder strap 120 each have a strap loop 128 which engages with shoulder strap receivers 136 on harness connecting bracket 132. Harness connecting bracket 132 is specifically designed such that either end of shoulder strap 120 may be removed from harness connecting bracket 132 to enable alteration of the vertical positioning of shoulder strap 120 on the infant by passing shoulder strap 120 through alternate pairs of harness slots 60.

Extension strap 124 also forms part of harness assembly 20. One end of extension strap 124 is attached to harness connecting bracket 132 at extension strap receiver 140, namely by engagement with strap loop 128 of extension strap 124. The second end of extension strap 124 is interconnected with adjusting assembly 24. More particularly, the second end of extension strap 124 passes between adjusting assembly mounting bracket 144 and gripper 164, is fixedly attached to spool 180, and is wound thereon.

Adjusting assembly 24 establishes the interconnection between center stock 68 of barrier assembly 16 and harness assembly 20 as illustrated in FIGS. 3-7. Particularly referencing FIGS. 3, 6, and 7, all components of adjusting assembly 24 are positioned on adjusting assembly mounting bracket 144 which is attached to the underside of seat member 32 by bolt 148, which passes through bore 66 on seat member 32, and nut 152 which threadably engages with bolt 148.

Adjusting assembly 24 generally includes gripper 164 and spool 180. As previously discussed, extension strap 124 passes between adjusting assembly mounting bracket 144 and gripper 164 where it is fixedly attached to spool 180 and then wound thereon. Spool 180 is rotatably mounted to adjusting assembly mounting bracket 144 by spool pivot pin 184 which is positioned in spool mounting yoke 176.

Spool 180 generally consists of harness receiver 188, to which extension strap 124 is attached and wound upon, and spring receiver 192, around which torsional spring 194 is wound. As best illustrated in FIG. 1, one end of torsional spring 194 contacts a suitable portion of spool 180, while the second end contacts mounting bracket extension 204 which is fixedly attached spool mounting yoke 176 of adjusting assembly mounting bracket 144. Torsional spring 194 acts to rotate spool 180 to remove any slack in extension strap 124, and thus shoulder strap 120, so as to always maintain tension on harness assembly 20 to ensure proper securement of an infant within infant car seat 10.

Figure 8:
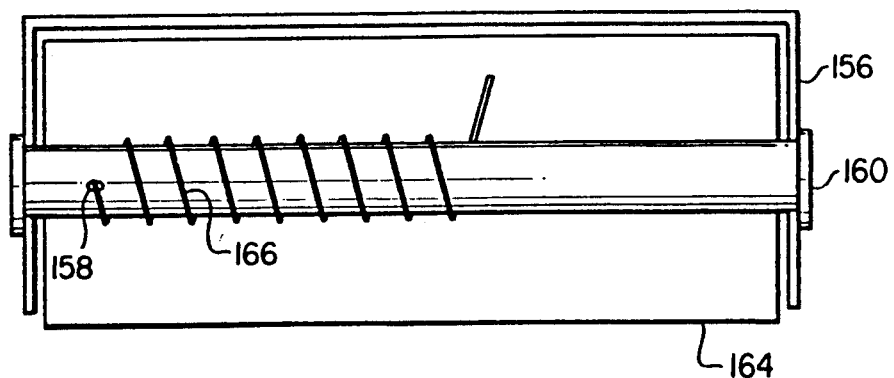
FIG. 8 is an enlarged, cutaway view of the gripper illustrating the biasing spring.

Gripper 164 interacts with extension strap 124 to either restrict or allow loosening of shoulder strap 120. Gripper 164 is pivotally mounted to adjusting assembly mounting bracket 144 by gripper pivot pin 160 which is positioned in gripper mounting yoke 156. Referring to FIG. 8, gripper 164 also includes third biasing spring 166, one end of which is positioned on an appropriate inner surface of gripper 164 and the second end of which is positioned in gripper pivot pin aperture 158 in gripper pivot pin 160, to bias gripper 164 into engagement with extension strap 124 to restrict loosening of harness assembly 20. Although third biasing spring has been described as such, any number of types of springs and interconnections may be utilized to achieve the desired biasing force.

When sufficiently engaged with extension strap 124 as illustrated in FIG. 6, gripping surface 168 on gripper 164 restricts movement of extension strap 124 which would loosen shoulder strap 120 on an infant within infant car seat 10. However, due to the configuration of gripping surface 168 and the positioning of gripper 164, extension strap 124 may be moved in a direction to remove slack from and thus tighten shoulder strap 120 by action of torsional spring 194 as will be discussed in more detail below. When gripper 164 is sufficiently disengaged with extension strap 124 in the manner discussed below and as illustrated in FIG. 7, extension strap 124 and thus shoulder strap 120 may be both tightened and loosened.

In order to provide the above-described two positions, gripper 164 is pivotally connectable to center stock 68 of barrier assembly 16 as illustrated in FIG. 3. In this regard, wire 208 is pivotally mounted in wire receiver 172 of gripper 164 in a position radially outward from gripper pivot pin 160. Wire 208 passes between wire guide pins 212 which support wire 208 vertically to a position where wire 208 will engage with center stock 68 when center stock 68 is pivoted toward the unlocked position.

Having described the elements of infant ca seat 10 and their general interconnections, the particular interaction between center stock 68 and adjusting assembly 24 will be described in more detail since it is important to achieving automatic adjustment of harness assembly 20 on the infant.

Generally, center stock 68 is used to alter the position of gripper 164 to either restrict or allow loosening of shoulder strap 120. When center stock 68 is in the locked position, as best illustrated in FIGS. 4 and 6, gripper 164 and center stock 68 are disconnected and third biasing spring 166 causes gripper 164, particularly gripping surface 168, to sufficiently engage with extension strap 124 to force it against adjusting assembly mounting bracket 144. Due to the shape of gripping surface 168, loosening of extension strap 124, and thus shoulder strap 120, is restricted when gripper 164 is in this particular position. However, gripping surface 168 allows slack to be removed from extension strap 124, and thus shoulder strap 120, by the action of torsional spring 194 on spool 180 to ensure proper conformance of shoulder strap 120 about an infant seated on infant car seat 10.

When center stock 68 is pivoted toward the unlocked position as illustrated in FIGS. 5 and 7, wire 208 engages with wire receiver 80 on center stock 68. Movement of center stock 68 in the direction of the arrow in FIG. 7 moves wire 208 in the direction of the arrow which causes gripper 164 to pivot in the direction of the arrow into a position where gripping surface 168 no longer sufficiently engages with extension strap 124 to restrict loosening of shoulder strap 120. This is the position used when the infant is to be removed from infant car seat 10.

Using as a reference point the position which restraint system 12 of infant car seat 10 must assume prior to placement of an infant therein, swing barrier 88 and center stock 68 would both be in the respective unlocked positions as illustrated in FIGS. 1 and 5. When the infant is properly positioned within infant car seat 10, swing barrier 88 is pivoted into the locked position as illustrated in FIG. 4. As swing barrier 88 pivots toward this locked position, shoulder strap 120, which is slidably engaged with swing barrier 88 as discussed above, is automatically placed about the infant in the proper position as illustrated in FIG. 2. In addition, shoulder strap 120 automatically adjusts to the contour of the body of the child since gripper 164 is sufficiently disengaged with extension strap 124 due to the positioning of center stock 68 (unlocked), thereby allowing the extension of shoulder strap 120. However, shoulder strap 120 is kept in tension by the action of torsional spring 194 on spool 180 which removes any slack from extension strap 124, and thus shoulder strap 120, to further ensure that proper conformance is maintained.

When swing barrier 88 has reached the locked position, shoulder strap 120 should conform to the body of the infant to adequately secure the infant within car seat 10 when restraint system 12 is locked. However, if the child had forced shoulder strap 120 away during the downward pivoting of swing barrier 88, upon release of this force by the child, torsional spring 194 would act on spool 180 to remove any remaining slack, resulting in shoulder strap 120 properly conforming to the body of the child. Therefore, the restraint system 12 of the present invention automatically adjusts harness assembly 20 about the child.

With swing barrier 88 and thus shoulder strap 120 in the above described configuration, center stock 68 is rotated into the locked position, resulting in tongue 112 on spring barrier 88 entering tongue receiver 76 on center stock 68 for engagement with the locking mechanism contained therein (not shown) as illustrated in FIG. 4. Tongue 112 and tongue receiver 76 are aligned such that only pivoting of center stock 68 is required to secure center stock 68 to swing barrier 88 to form a fixed frontal barrier.

In order to remove a child from infant car seat 10 when restraint system 12 is in the above-described locked position, actuator 86 on center stock 68 is compressed to release or disengage tongue 112 from the locking mechanism contained within tongue receiver 76 of center stock 68. Center stock 68 is then pivoted into the unlocked position illustrated in FIGS. 5 and 7. During downward pivoting of center stock 68, wire 208 engages with wire receiver 80 on center stock 68, forcing wire 208 in the direction indicated by the arrow in FIG. 7. Movement of wire 208 in this direction causes gripper 164 to pivot about gripper pivot pin 160 such that gripping surface 168 becomes sufficiently disengaged with extension strap 124 to allow loosening of extension strap 124, and thus shoulder strap 120. Swing barrier 88 is then pivoted into its unlocked position and during such pivotation, the overall length of unwound portions of the harness assembly 20 is increased to allow the child to be easily removed from infant car seat 10.

While the present invention has been described with respect to a specific preferred embodiment thereof, various changes and modifications may be suggested to one skilled in the art, and it is intended that the present invention encompass such changes and modifications as fall within the scope of the claims which follow below.

What is claimed is:

1. A chile car seat having a back and a seat member, comprising:
   a) center stock means pivotally connected to the seat member, wherein said center stock means is pivotable between at least a first center stock position and a second center stock position;
   b) barrier means pivotally connected to the chile car seat and detachably connected to said center stock means when said center stock means is in said first center stock position;
   c) harness means having a first end and a second end, wherein said first end is interconnected with said barrier means;

d) adjuster means connected to said second end of said harness means, said adjuster means being movable between at least a first adjuster position and a second adjuster position, said first adjuster position restricting movement of said harness means relative to said adjuster means in a first direction, said second adjuster position allowing movement of said harness means relative to said adjuster means in said first direction; and e) means for interconnecting said center stock means and said adjuster means, wherein when said center stock means is in said first center stock position said adjuster means is in said first adjuster position and when said center stock means is in said second center stock position said adjuster means is in said second adjsuter position.

2. A car seat, as claimed in claim 1, wherein said center stock means includes a first biasing means for biasing said center stock means toward said second center stock position.

3. A car seat, as claimed in claim 2, wherein said first biasing means includes spring means.

4. A car seat, as claimed in claim 1, wherein said center stock means includes means for disconnecting said center stock means from said barrier means.

5. A car seat, as claimed in claim 1, wherein said barrier means includes a first extension member pivotally connected to one side of the car seat, a second extension member pivotally connected to the second side of the car seat and a substantially horizontal member interconnecting said first and second extension members.

6. A car seat, as claimed in claim 1, wherein said barrier means includes a barrier member and a second biasing means for biasing said barrier member away from said divider means.

7. A car seat, as claimed in claim 6, wherein said second biasing means includes spring means.

8. A car seat, as claimed in claim 1, wherein said adjuster means includes spring means and said spring means maintains said harness means in tension, pulling said harness means in a second direction opposite of said first direction.

9. A car seat as claimed in claim 8, wherein said spring means includes a torsional spring.

10. A car seat, as claimed in claim 1, wherein said adjuster means includes gripping means, wherein when said adjuster means is in said first position said gripping means engages said harness means.

11. A car seat, as claimed in claim 10, wherein said gripping means includes a gripper and third biasing means for biasing said gripper in said first position.

12. A car seat, as claimed in claim 11, wherein said third biasing means includes spring means.

13. A car seat, as claimed in claim 1, wherein said means for interconnecting is pivotally connected to said adjusting means.

14. A car seat, as claimed in claim 1, wherein said means for interconnecting engages said center stock means when said center stock means is pivoted from said first center stock position to said second center stock position.

15. A car seat, as claimed in claim 1, wherein said means for interconnecting is disengaged from said center stock means when said center stock means is in said first center stock position.

16. A child car seat having a back and a seat, comprising:

a) harness means for securing a chile seated on the car seat;

b) barrier means connected to said harness means with said barrier means being disposed in a first position substantially in front of the child after the child is seated on the car seat, wherein said barrier means includes a restraining member and a movable center stock, said center stock being detachable from said restraining member; and c) adjusting means connected to said harness means for automatically securing said harness means relative to the chile, wherein said adjusting means includes a first means for automatically taking up the slack in said harness means after said barrier means is in said first position and a second means interconnecting said center stock and said first means, said second means being movable, using said center stock, to move said first means.

17. A car seat, as claimed in claim 16, wherein said first means includes a gripping member that permits at least portions of said harness means to move in a first direction for taking up slack in said harness means.

18. A car seat, as claimed in claim 16, wherein said first means includes spring means and spool means in which said spring means acts to cause a winding of portions of said harness means about said spool means to take up slack in said harness means.

19. A child car seat having a back and a seat comprising:

harness means for securing a child seated on the car seat;

barrier means connected to said harness means with said barrier means being disposed in a first position substantially in front of the child after the child is seated on the car seat, said barrier means including a restraining member and a center stock with said center stock being detachable from said restraining member;

adjusting means connected to said harness means for automatically securing said harness means relative to the chile, wherein said adjusting means includes means for automatically taking up the slack in said harness means after said barrier means is in said first position; and wherein said center stock is pivotally attached to a portion of the car seat.

* * * * *

UNITED STATES PATENT AND TRADEMARK OFFICE
CERTIFICATE OF CORRECTION

PATENT NO. : 5,061,012
DATED : October 29, 1991
INVENTOR(S) : Robert M. Parker et al It is certified that error appears in the above-identified patent and that said Letters Patent is hereby corrected as shown below:

Column 12, line 56 "chile" should be --child--; line 62, "chile" should be --child--.

Column 13, line 37, "divider" should be --center stock--; line 49, "first position" should be --first adjuster position--; line 53, "in" should be --toward--; same line, "first position" should be --first adjuster position--.

Column 14, line 12, "chile" should be --child--; line 23, "chile" should be --child--; line 29, the comma should be deleted; line 52, "chile" should be --child--.

Signed and Sealed this

Twenty-eighth Day of June, 1994

Attest:

BRUCE LEHMAN

*Attesting Officer*   Commissioner of Patents and Trademarks